United States Patent Office 3,220,981

Patented Nov. 30, 1965

3,220,981
ETHYLENICALLY UNSATURATED EPOXY SULFONES

Donald L. MacPeek, South Charleston, and Benjamin Phillips and Paul S. Starcher, Charleston, W. Va., assignors to Union Carbide Corporation, a corporation of New York No Drawing. Filed Jan. 23, 1961, Ser. No. 83,871
22 Claims. (Cl. 260—49)

This invention relates to ethylenically unsaturated epoxy sulfones. In one aspect, the invention relates to a method for preparing ethylenically unsaturated epoxy sulfones. In another aspect, the invention relates to polymeric compositions resulting from the polymerization of ethylenically unsaturated epoxy sulfones.

The polymerizable compositions of the invention can be readily handled in resin-forming operations such as coating, laminating, bonding, molding, casting, potting, and the like. These polymerizable compositions are capable of accepting solid materials, such as fillers and pigments, for providing various effects in physical properties and coloration. With or without such added solid materials, the polymerizable compositions can be made to fill small intricacies of molds without the necessity of applying high pressures or heating to high temperatures, although such measures can be employed, if desired. The polymerizable compositions also can be easily spread, brushed, or sprayed by many techniques available in the paint, lacquer, and varnish industries for making coatings and finishes. The polymerizable compositions are capable of being accurately shaped by molds having intricate molding surfaces and fully cured to resins carrying exact details of such molding surfaces. They can be also advantageously employed in the potting of such fragile articles as electronic components.

The curable, polymerizable compositions of the invention also can be partially reacted at elevated temperatures to form viscous thermosetting liquids or thermosetting solids. The resulting thermosetting intermediate reaction products can be dissolved in an inert normally-liquid organic medium and applied as heat-curable coatings. To aid solution, the thermosetting solid products can be powdered or granulated, if desired. The thermosetting solids also can be used as molding powder compositions which can be converted to fully cured solid products by the application of heat and/or pressure. Numerous other uses, applications, and unexpected advantages and results will become apparent upon a consideration of the various embodiments of the invention which are discussed hereinafter.

Accordingly, one or more of the following objects will be achieved by the practice of the invention.

It is an object of the invention to prepare novel ethylenically unsaturated epoxy sulfones. It is another object of the invention to prepare novel homopolymers of ethylenically unsaturated epoxy sulfones which are useful, for example, in hydraulic fluids, lubricating oils, molding resins, and the like. It is a further object to provide novel compositions which can be cross-linked at various stages of processing to yield complex dimensional structures. A still further object of the invention is to provide resins polymerized substantially through the ethylenically unsaturated group. Another object of the invention is to provide resins polymerized substantially through the ethylenically unsaturated group and cross-linked through the epoxy group. Another object of the invention is to provide novel compositions obtained by the reaction of the product resulting from the initial polymerization through the olefinic linkage of the ethylenically unsaturated epoxy sulfones and an active organic hardener. A further object of the invention is to provide novel polymers obtained by the reaction of an ethylenically unsaturated epoxy sulfone and a polymerizable unsaturated monomer having at least one ethylenically unsaturated, polymerizable group. A yet further object is to provide novel compositions obtained by the reaction of the product resulting from the initial polymerization of an ethylenically unsaturated epoxy sulfone with polymerizable unsaturated monomers having at least one ethylenically unsaturated polymerizable group and an active organic hardener. Other objects will become apparent to those skilled in the art in light of the instant specification.

In a broad aspect, the invention relates to novel and useful monomeric ethylenically unsaturated monoepoxy sulfones characterized by the following formula:

$$R—(X)_n—SO_2—(X)_n—R_1$$

wherein R represents (a) a vic-epoxyalkyl radical wherein the vic-epoxy moiety is at least one carbon atom removed from the sulfonyl group, (b) a vic-epoxycycloalkyl radical wherein the cycloalkyl ring contains from 5 to 7 carbon atoms and wherein the vic-epoxy moiety is at least one carbon atom removed from the sulfonyl group, (c) a vic-epoxycycloalkylalkyl radical wherein the cycloalkyl ring contains from 5 to 7 carbon atoms, (d) a 3-oxatricyclo[3.2.1.0$^{2,4}$]oct-6-yl radical or (e) a 4-oxatetracyclo[6.2.1.0$^{2,7}$.0$^{3,5}$]undec-9-yl radical; wherein $R_1$ represents (a) an alkenyl radical, (b) a cycloalkenyl radical wherein the cycloalkenyl ring contains from 5 to 7 carbon atoms, (c) a cycloalkenylalkyl radical wherein the cycloalkenyl ring contains from 5 to 7 carbon atoms, (d) a bicyclo[2.2.1]-5-hepten-2-yl radical or (e) a tricyclo[5.2.1.0$^{2,6}$]-3-decen-8-yl radical; wherein each X, individually, can be carbonyloxyalkylene or oxyalkylene, the alkylene moiety of which contains at least 2 carbon atoms, preferably from 2 to 6 carbon atoms; and wherein each *n*, individually, is an integer having a value less than two including zero; with the proviso that when *n* equals one, then the sulfonyl group $—SO_2—$, depicted in Formula I, is bonded to the alkylene moiety of the X variable. It should be noted at this time that the expression "vic-epoxy," as used herein including the appended claims, refers to the group

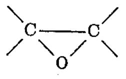

i.e., wherein the oxygen atom is bonded to vicinal carbon atoms. This term "vic-epoxy" is a recognized abbreviation for the expression "vicinal epoxy." The notation that the vic-epoxy group is contained in the cycloaliphatic ring indicates that the carbon atoms of said vic-epoxy group form a part of the cycloaliphatic ring or nucleus. The cycloaliphatic ring preferably contains from 5 to 7 carbon atoms including the epoxy carbon atoms. In addition, the expression "lower alkyl," as used herein including the appended claims, refers to a monovalent saturated aliphatic hydrocarbon radical which contains from 1 to 4 carbon atoms. Moreover the "alkyl" moiety in the expression "vic-epoxycycloalkylalkyl" indicates that this moiety preferably contains up to 7 carbon atoms, is monovalently bonded to the "vic-epoxycycloalkyl" group, and also is monovalently bonded to the available carbonyloxy, i.e.

oxy, i.e., —O—, or the sulfonyl group, i.e., $—SO_2—$ group.

With reference to Formula I supra, illustrative R variables include, among others, glycidyl,
2,3-epoxybutyl,
methylglycidyl, 2-methyl-2,3-epoxybutyl,
2,3-epoxypentyl,
2,3-epoxyhexyl,
2,3-epoxyoctyl,
4,5-epoxyhexyl,
4,5-epoxypentyl,
5,6-epoxyoctyl,
10,11-epoxyundecyl,
9,10-epoxydecyl,
9,10-epoxyoctadecyl,
6-oxabicyclo[3.1.0]hex-2-yl,
4-methyl-6-oxabicyclo-[3.1.0]hex-2-yl,
4-isopropyl-6-oxabicyclo[3.1.0]hex-2-yl,
7-oxabicyclo[4.1.0]hept-3-yl,
1-ethyl-7-oxabicyclo[4.1.0]hept-3-yl,
6-methyl-7-oxabicyclo[4.1.0]hept-3-yl,
4-n-butyl-7-oxabicyclo[4.1.0]hept-3-yl,
5-amyl-7-oxabicyclo[4.1.0]hept-3-yl,
2,6-diethyl-7-oxabicyclo[4.1.0]hept-3-yl,
8-oxabicyclo[5.1.0]oct-3-yl,
8-oxabicyclo[5.1.0]oct-4-yl,
2-ethyl-8-oxabicyclo[5.1.0]oct-3-yl,
6-oxabicyclo[3.1.0]hex-2-ylmethyl,
4-methyl-6-oxa-bicyclo[3.1.0]hex-2-ylethyl,
7-oxabicyclo[4.1.0]hept-3-ylmethyl,
2-n-propyl-7-oxabicyclo[4.1.0]hept-3-ylmethyl,
7-oxabicyclo[4.1.0]hept-3-ylpropyl,
7-oxabicyclo[4.1.0]hept-3-ylamyl,
8-oxabicyclo[5.1.0]oct-3-ylmethyl, 8-oxabicyclo[5.1.0]oct-3-ylethyl,
3-oxatricyclo[3.2.1.0$^{2,4}$]oct-6-yl,
4-oxatetracyclo[6.2.1.0$^{2,7}$.0$^{3,5}$]undec-9-yl,
7-methyl-3-oxatricyclo[3.2.1.0$^{2,4}$]-oct-6-yl,
2-(3-oxatricyclo[3.2.1.0$^{2,4}$]oct-6-yl)ethyl,
6-(3-oxatricyclo[3.2.1.0$^{2,4}$]oct-6-yl)hexyl,
methylglycidyloxyethyl, 3,4-epoxybutoxypropyl, 9,10-epoxydecyloxybutyl,
7-oxabicyclo-[4.1.0]hept-3-yloxyethyl,
4-ethyl-7-oxabicyclo[4.1.0]hept-3-yloxymethyl,
3-oxatricyclo[3.2.1.0$^{2,4}$]oct-6-ylmethoxy,
3-oxatricyclo[3.2.1.0$^{2,4}$]oct-6-ylhexoxy,
2-(3-oxatricyclo[3.2.1.0$^{2,4}$]-oct-6-ylmethoxy)ethyl,
6-(7-hexyl-3-oxatricyclo[3.2.1.0$^{2,4}$]oct-6-ylethoxy)hexyl,
4-oxatetracyclo[6.2.1.0$^{2,7}$.0$^{3,5}$]undec-9-yloxypropyl,
4-oxatetracyclo[6.2.1.0$^{2,7}$.0$^{3,5}$]undec-9-yloxyhexoxy,
3-methyl-3,4-epoxybutylcarbonyloxyethyl,
9,10-epoxydecylcarbonyloxybutyl,
4-ethyl-7-oxabicyclo[4.1.0]hept-3-ylcarbonyloxymethyl,
3-oxatricyclo[3.2.1.0$^{2,4}$]oct-6-ylcarbonyloxyethyl,
3-oxatricyclo[3.2.1.0$^{2,4}$]oct-6-ylcarbonyloxyhexyl,
6-(3-oxatricyclo-[3.2.1.0$^{2,4}$]oct-6-ylcarbonyloxy)hexyl,
4-oxatetracyclo[6.2.1.0$^{2,7}$.0$^{3,5}$]undec-9-ylcarbonyloxypropyl,
and the like.

Illustrative $R_1$ variables include among others, vinyl,
2-methyl-2-propnyl, crotyl, allyl, isobutenyl, 2-pentenyl,
2-octenyl, 4-hexenyl, 4-pentenyl, 5-octenyl, 10-undecenyl,
9-decenyl, 9-octa-decenyl, 2-cyclopentenyl,
4-methyl-2-cyclopentyl,
4-isopropyl-2-cyclopentenyl,
3-cyclohexenyl,
3-ethyl-3-cyclohexenyl,
4-methyl-2-cyclohexenyl,
6-n-butyl-3-cyclohexenyl,
5-amyl-3-cyclohexenyl,
2,4-diethyl-3-cyclohexenyl,
3-cycloheptenyl, 4-cycloheptenyl,
2-ethyl-3-cycloheptenyl, 4-cycloheptenyl,
3-ethyl-3-cyclohexenyl, 4-methyl-2-cyclopentenylethyl,
4-cyclohexenylmethyl, 5-ethyl-3-cyclohexenylpropyl,
3-cyclohexenylamyl, 3-cycloheptenylmethyl,
3-cycloheptenylethyl, bicyclo[2.2.1]-5-hepten-2-yl,
tricyclo[5.2.1.0$^{2,6}$]-3-decen-8-yl,
7-methylbicyclo[2.2.1]-5-hepten-2-yl,
2-(bicyclo-[2.2.1]-5-hepten-2-yl)ethyl,
6-bicyclo[2.2.1]5hepten2-yl)-hexyl,
2-methyl-2-propenyloxyethyl, 3-butenyloxypropyl,
9-decenyloxybutyl, 3-cyclohexenyloxyethyl,
6-ethyl-3-cyclohexenyloxymethyl,
bicyclo[2.2.1]-5-hepten-2-ylmethoxy,
bicyclo[2.2.1]-5-hepten-2-ylhexoxy,
2-(bicyclo[2.2.1]-5-hepten-2-ylmethoxy)ethyl,
6-(7-hexylbicyclo[2.2.1]-5-hepten-2-ylethoxy)hexyl,
tricyclo-[5.2.1.0$^{2,6}$]-3-decen-8-yloxypropyl,
3-methyl-3-butenylcarbonyloxyethyl,
9-decenylcarbonyloxybutyl,
6-ethyl-3-cyclohexanylcarbonyloxymethyl,
bicyclo[2.2.1]-5-hepten-2-yloctylcarbonyloxyethyl,
bicyclo[2.2.1]-5-hepten-2-ylcarbonyloxyhexyl,
6-(bicyclo[2.2.1]-5-hepten-2-ylcarbonyloxy)hexyl,
tricyclo[5.2.1.0$^{2,6}$]-3-decen-8-ylcarbonyloxypropyl
and the like.

Illustrative subclasses of ethylenically unsaturated monoepoxy sulfones include, for example, alkenyl vicepoxyalkyl sulfone,
cycloalkenyl vic-epoxyalkyl sulphone,
alkenyl vic-epoxy-cycloalkyl sulfone,
alkenyl 3-oxatricyclo[3.2.1.0$^{2,4}$]oct-6-yl sulfone,
alkenyl 4-oxatetracyclo[6.2.1.0$^{2,7}$.0$^{3,5}$]undec-9-yl sulfone,
bicyclo[2.2.1]-5-hepten-2-yl vic-epoxyalkyl sulfone,
bicyclo[2.2.1]-5-hepten-2-yl 3-oxatricyclo[3.2.1.0$^{2,4}$]oct-6-yl sulfone,
alkenyloxyalkyl vic-epoxyalkoxyalkyl sulfone,
cycloalkenyloxyalkyl vic-epoxycycloalkoxy alkyl sulfone,
alkenyloxyalkyl vic-epoxycycloalkoxyalkyl sulfone,
cycloalkenyl vic-epoxycycloalkyl sulfone,
alkenyloxyalkyl-3-oxatricyclo[3.2.1.0$^{2,4}$]oct-6-yloxyalkyl sulfone,
4-oxatetracyclo[6.2.1.0$^{2,7}$.0$^{3,5}$]undec-9-yloxy-alkyl tri cyclo[5.2.1.0$^{2,6}$]-3-decen-8-yl oxyalkyl sulphone,
alkenyloxyalkyl 4-oxatetracyclo [6.2.1.0$^{2,7}$.0$^{3,5}$] undec-9-yloxy-alkyl sulfone,
bicyclo [2.2.1]-5-hepten-2-yloxyalkyl vic-epoxyalkoxyalkyl sulfone,
bicyclo[2.2.1]-5-hepten-2-yloxyalkyl 3-oxatricyclo [3.2.1.0$^{2,4}$]oct-6-yloxyalkyl sulfone,
alkenlycarbonyloxyalkyl vic-epoxyalkylcarbonyloxyalkyl sulfone,
cycloalkenylcarbonyloxyalkyl vic-epoxcycloalkylcarbonyloxyalkyl sulfone,
alkenylcarbonyloxyalkyl 3-oxatricyclo[3.2.1.0$^{2,4}$]oct-6-ylcarbonyloxy alkyl sulphone,
alkenylcarbonyloxyalkyl 4-oxatetracyclo-[6.2.1.0$^{2,7}$.0$^{3,5}$] undec-9-ylcarbonyloxyalkyl sulfone,
bicyclo-[2.2.1]-5-hepten-2-ylcarbonyloxyalkyl vic-epoxyalkycarbonyloxyalkyl sulfone,
bicyclo[2.2.1]-5-hepten-2-ylcarbonyloxyalkyl 3-oxatricyclo[3.2.1.0$^{2,4}$]oct-6-ylcarbonyloxyalkyl sulphone,
and the like.

Specific examples of ethylenically unsaturated monoepoxide sulfones include, for instance, allyl glycidyl sulfone, methallyl methylglycidyl sulfone, crotyl 2,3-epoxybutyl sulfone, glycidyl vinyl sulfone, 9,10-epoxyoctadecyl 9-octadecenyl sulfone, 3-cyclopentenyl 6-oxabicyclo[3.1.0]hex-2-yl sulfone, lower alkyl substituted 2-cyclopentenyl lower alkyl substituted 6-oxabicyclo[3.1.0]hex-2-yl sulfone, 4-n-butyl-6-oxabicyclo[3.1.0]hex-2-yl 2-methyl-3-cyclopentenyl sulfone, 3-cyclohexenyl 7-oxabicyclo[4.1.0]hept-3-yl sulfone, lower alkyl substituted 3-cyclohexenyl lower alkyl substituted 7-oxabicyclo[4.1.0]hept-3-yl sulfone, 4-isopropyl-3-cyclohexenyl 2-methyl-7-oxabicyclo [4.1.0]hept-3 - yl sulfone, 3 - cyclohexenyl 8 - oxabicyclo

[5.1.0]oct-3-yl sulfone, lower alkyl substituted 3-cycloheptenyl lower alkyl substituted 8-oxabicyclo[5.1.0]oct-3-yl sulfone, 2-cyclopentenylalkyl 6-oxabicyclo[3.1.0]hex-2-ylalkyl sulfone, 3-cyclopentenylmethyl 6-oxabicyclo[3.1.0]hex-2-ylmethyl sulfone, 3-cyclohexenylalkyl 7-oxabicyclo[4.1.0]hept-3-ylalkyl sulfone, 3-cyclohexenylmethyl 7-oxabicyclo[4.1.0]hept-3-ylmethyl sulfone, 3cyclohexenylbutyl 7-oxabicyclo[4.1.0]hept - 3-ylbutyl sulfone, 3-cycloheptenylethyl 8-oxabicyclo [5.1.0]oct-3-yl-ethyl sulfone, allyl 3-oxatricyclo[3.2.1.$0^{2,4}$]oct-6-ylmethyl sulfone, bicyclo[2.2.1] - 5-hepten - 2-yl 3-oxatricyclo[3.2.1.$0^{2,4}$]oct-6-yl sulfone, 4-oxatetracyclo[6.2.1.$0^{2,7}$.$0^{3,5}$]undec-9-yl tricyclo[5.2.1.$0^{2,6}$]-3-decen-8-yl sulfone, 3-cyclohexenyl 3-methyl-4,5-epoxypentyl sulfone, 2-cyclopentenyl 5,6-epoxyhexyl sulfone, 3-cycloheptenyl 9,10-epoxydecyl sulfone, 3-oxatricyclo[3.2.1.$0^{2,4}$]oct-6-yl vinyl sulfone, 9-decenyl 3-oxatricyclo[3.2.1.0.$^{2,4}$]oct-6-yl sulfone, allyl 4-oxatetracyclo[6.2.1.$0^{2,7}$.$0^{3,5}$]undec-9-yl sulfone, 7-octenyl 4-oxatetracyclo[6.2.1.$0^{2,7}$.$0^{3,5}$]undec-9-yl sulfone, bicyclo[2.2.1] - 5-hepten - 2-yl 4,5 - epoxypentyl sulfone, methallyloxyethyl methylglycidyloxyethyl sulfone, allyloxybutyl 4,5-epoxypentoxybutyl sulfone, 3,4-epoxybutoxyhexyl 4-pentenyloxyhexyl sulfone, 6-heptenyloxyethyl 7-oxabicyclo[4.1.0]hept - 3 - yloxethyl sulfone, 4-butenyloxyethyl 3-oxatricyclo[3.2.1.$0^{2,4}$]oct-6-yloxethyl sulfone, 7-octenyloxypropyl 4 - oxatetracyclo[6.2.1.$0^{2,7}$.$0^{3,5}$]undec-9-yloxypropyl sulfone, 6-allyloxyhexyl 6-(4-oxatetracyclo[6.2.1.$0^{2,7}$.$0^{3,5}$]undec - 9 - yeoxy(hexyl sulfone, bicyclo[2.2.1]-5-hepten-2-yloxyethyl 3,4-epoxybutoxyethyl sulfone, 2,2'-sulfonyl diethanol 3-methyl-3-cyclohexenecarboxylate 1-methyl-7-oxabicyclo[4.1.0]hept-3-anecarboxylate, 2,2'-sulfonyldiethanol 3-cyclohexenecarboxylate 7-oxabicyclo[4.1.0]hept - 3-anecarboxylate, 3,3'-sulfonyldipropanol 2-cyclopentenecarboxylate 6-oxabicyclo[3.1.0]hex-2-anecarboxylate, 6,6'-sulfonyldihexanol 5-hexenecarboxylate 4-oxatetracyclo[6.2.1.$0^{2,7}$.$0^{3,5}$]undec - 9 - anecarboxylate, 5,5'-sulfonyldipentanol bicyclo[2.2.1]-5-hept-2-anecarboxylate 4,5-epoxyheptanoate, and the like.

The ethylenically unsaturated epoxy sulfones of the invention can be prepared by various routes. The preferred route involves the reaction of a molar excess of a diolefinically unsaturated sulfone, for example, bis(alkenyl) sulfone, bis(cycloalkenyl) sulfone, and the like, with a solution of a peracid such as, peracetic acid, perbenzoic acid, perpropionic acid, and the like, in an inert normally-liquid organic medium such as ethyl acetate, acetone, butyl acetate, and the like at a temperature range of from about 0° C. to about 100° C., preferably from about 25° C. to about 80° C., for a period of time sufficient to introduce oxirane oxygen at one of the sites of the carbon to carbon double bonds of the ethylenically unsaturated sulfone. The quantity of peracid consumed during the epoxidation reaction can be readily determined during the course of the reaction. A residence time of from about several minutes to about several hours, e.g. 30 minutes to 18 hours, is satisfactory in many instances. In this particular reaction, an excess of the ethylenically unsaturated sulfone is use so that only a sufficient amount of peracid will be available to epoxidize only one of the carbon to carbon double bonds of the ethylenically unsaturated sulfone reagent. The inert normally-liquid organic vehicle and the acid by-product can be recovered from the reaction product mixture, for example, by distillation under reduced pressure. If desired, the residue product can be subjected to fractional distillation, crystallization, and the like to obtain the ethylenically unsaturated epoxy sulfone product in high purity. The ethylenically unsaturated epoxy sulfones also can be prepared by the reaction of, for instance, bis(alkenyl) sulfide, bis(cycloalkenyl) sulfide, bis(cycloalkenylalkyl) sulfide or, bis(bicycloalkenyl) sulfide with a maximum of 3 mols of peracetic acid per mol of sulfide reagent under the operative conditions noted previously. In this invention, the sulfide moiety, i.e., —S—, is oxidized to the sulfone group, i.e., —$SO_2$—, and oxirane oxygen is introduced at the site of one of the carbon to carbon double bonds of the sulfide reagent. The Diels-Alder reaction provides a convenient method for preparing diunsaturated and polyunsaturated sulfones. For instance, a conjugated dienic hydrocarbon, e.g., 1,3-butadiene, 1,3-hexadiene, isoprene, piperylene, cyclohexadiene, cycloheptadiene, myrcene, cyclopentadiene, alkyl substituted-cyclopentadiene, etc., can be reacted with less than about 0.5 mol per mol of said dienic hydrocarbon of a diunsaturated sulfone, e.g., dialkenyl sulfone, divinyl sulfone, and the like, at elevated temperatures, e.g., about 25° C. to about 150° C. and higher, to provide a bis(cycloalkenyl) sulfone, a bis(alkenyl substituted cycloalkenyl) sulfone or a bis(bicycloalkenyl) sulfone product. A further route for preparing symmetrical and unsymmetrical monoepoxy sulfones involves the reaction of an haloalkene or halocycloalkene, e.g. ally chloride, 3-chlorocyclopentene, 8-chlorotricyclo-[5.2.1.$0^{2,6}$]-3-decene, 4-chlorocyclohexene, etc., with the sodium salt of an alkenyl mercaptan or cycloalkenyl mercaptan, i.e., RSNa wherein R can be alkenyl or cycloalkenyl and in which the RSNa preferably is contained in the corresponding mercaptan as a vehicle, at elevated temperatures, e.g., from about 25° C. to 200° C., and higher, to produce the polyunsaturated sulfide. The resulting polyunsaturated sulfide product then can be reacted with a quantity of peracid which is at least sufficient to introduce oxirane oxygen at the site of one of the carbon to carbon double bonds, and additionally, to convert the sulfide moiety to the sulfone moiety. For instance, a maximum of 3 moles of peracid is required to epoxidize one mole of bis(methallyl) sulfide to the corresponding methallylmethylglycidyl sulfone. By way of a further illustration, a maximum of 3 moles of peracid per mole of bis(tricyclo[5.2.1.$0^{2,6}$]-3-decen-8-yl) sulfide is required to epoxidize one of the carbon to carbon double bonds and to convert the sulfide group to the sulfone group to form the corresponding 4-oxatetracyclo[6.2.1.$0^{2,7}$.$0^{3,5}$]undec-9-yl tricyclo[5.2.1.$0^{2,6}$]3-decen-8-yl sulfone.

A still further route for preparing the novel epoxy sulfones involves the reaction to unsaturated mercaptans, e.g., alkenyl mercaptan, cycloalkenyl mercaptan, etc., with dicyclopentadiene to produce the polyunsaturated sulfide, followed by epoxidation to produce the corresponding ethylenically unsaturated epoxy sulfone. Typical unsaturated mercaptans include allyl mercaptan, crotyl mercaptan, 4-hexenethiol, 6-octenethiol, 3-cyclohexenyl-3-propanethiol, 3-cyclohexenyl - 12-dodecanethiol, 6-(bicyclo[2.2.1]-5-hepten-2 - yl)hexanethiol, 8-(bicyclo[2.2.1]-5-hepten-2-yl)octanethiol, and the like.

The monomers of the invention are characterized by the presence of one vicinal epoxy group,

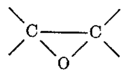

and one ethylenic group, >C=C<, in the sulfone molecule. The presence of two functional groups in the one molecule makes them highly useful for the preparation of cross-linked resin structures. For example, the ethylenic groups can be polymerized with each other or with other vinyl monomers through the ethylenic grouping in the presence of a suitable peroxide catalyst to form soluble, fusible, linear polymers and further cured with an active organic hardener or cross-linked through the epoxide grouping in the absence or preferably in the presence of basic or acidic catalysts to form insoluble, infusible compositions. In another manner, the ethylenically unsaturated epoxy sulfones of the invention can be polymerized through the epoxide groups with or without the presence of a suitable basic or acidic catalyst and cross-linked in the presence of suitable peroxide catalysts through the unsaturated ethylenic group to form insoluble, infusible compositions.

Accordingly, the first preferred embodiment of the invention pertaining to polymeric compositions is directed to novel polymeric products of novel ethylenically unsaturated epoxy sulfone(s) polymerized through the epoxy group, said products containing free ethylenic groups. The polymerization is preferably conducted in the presence of an acidic or basic catalyst, described hereinafter. The useful polymeric products obtained, range from viscous liquids to tough, hard resins. A single ethylenically unsaturated epoxy sulfone can be employed in the polymerization to obtain a useful homopolymeric product. If desired, a mixture of at least two ethylenically unsaturated epoxy sulfones can be employed in the polymerization reaction. In general, when two ethylenically unsaturated epoxy sulfones are employed, the concentra- of one of the monomers can vary over the entire range, preferably from 5 to 95 weight percent. Additionally, the polymerized products of this embodiment can be further polymerized through the available ethylenic groups in the presence of a peroxide catalyst, hereinafter described, to obtain a hard, cured resin.

The second embodiment of the invention pertaining to polymeric compositions is directed to novel polymeric products of novel ethylenically unsaturated epoxy sulfone(s) polymerized through the ethylenic group, said products containing free epoxy groups. The polymerization is preferably conducted in the presence of a suitable peroxide catalyst, described hereinafter. The polymeric products are useful, infusible compositions. Additionally, the polymerized products of this embodiment can be further polymerized through the available epoxy groups in the presence of an acidic or basic catalyst, hereinafter described, to obtain a hard, cured resin. The polymeric products are useful, infusible compositions.

The third embodiment of the invention pertaining to polymeric compositions is directed to novel polymeric products resulting from the polymerization of ethylenically unsaturated epoxy sulfone(s) with other epoxides through the epoxy group preferably conducted in the presence of a suitable acidic or basic catalyst, described hereinafter. The resulting polymeric composition contain free ethylenic groups with or without free epoxy groups. Suitable epoxides which can be reacted with ethylenically unsaturated epoxy sulfone(s) include other ethylenically unsaturated epoxy sulfones, polyepoxides such as limonene dioxide, 4-vinylcyclohexene dioxide, dicyclopentadiene dioxide, divinylbenzene dioxide, 3,4-epoxy-6-methylcyclohexylmethyl 3,4-epoxy-6-methylcyclohexanecarboxylate, diethylene glycol bis(3,4-epoxycyclohexanecarboxylate), bis(2,3-epoxycyclopentyl) ether, bis(3,4-epoxycyclohexylmethyl) pimelate, 1,1,1-trimethylolpropane tris(3,4-epoxycyclohexanecarboxylate), the polyglycidyl polyethers of polyhydric phenols, and the like. The resulting product of this embodiment is a useful, insoluble, fusible composition.

The fourth embodiment of the invention pertaining to polymeric compositions is directed to novel polymeric products resulting from the polymerization of the product of the second preferred embodiment, supra, with the same or other epoxides, as described above, through the free epoxy group preferably conducted in the presence of a suitable acidic or basic catalyst, described hereinafter. The resulting product is a cross-linked, insoluble, fusible composition.

The fifth preferred embodiment of the invention pertaining to polymeric compositions is directed to the novel polymeric products resulting from the polymerization of the product of the first or third preferred embodiment, supra, with vinyl monomers which contain at least one polymerizable ethylenic unsaturated bond, through the ethylenic unsaturated group. The polymerization is preferably conducted in the presence of a peroxide catalyst, described hereinafter. Suitable polymerizable vinyl monomers include the aromatic monomers containing ethylenically unsaturated side chains such as styrene, chlorostyrene, allyl-styrene and the like. Another typical group of polymerizable unsaturated monomers polymerizable with the epoxy monomers are the vinyl halides, such as vinyl chloride, vinyl bromide and vinyl fluoride; acrylonitrile; methacrylonitrile; and the vinylidene halides such as vinylidene chloride, vinylidene bromide and vinylidene fluoride. Other typical groups of polymerizable unsaturated monomers polymerizable with the epoxy monomers include: a vinyl ester of an aliphatic monocarboxylic acid, for example, vinyl acetate, vinyl butyrate, vinyl chloroacetate, vinyl formate, vinyl caproate and the like; unsaturated aliphatic esters of a saturated aliphatic polybasic acid or an unsaturated aliphatic ester of an unsaturated aliphatic polybasic acid or unsaturated esters of dibasic aromatic acids, for example, the divinyl, diallyl and dimethallyl esters of oxalic, maleic, malonic, citric, and tartaric acids; the divinyl, diallyl and dimethallyl esters of phthalic, isophthalic, terephthalic and naphthalene dicarboxylic acids; monomers having a conjugated system of ethylenic double bonds, for instance, 1,3-butadiene, isoprene, 2,3-dimethyl-1,3-butadiene, 1-acetoxy-1,3-butadiene, 2-cyano-1,3-butadiene and the like; other suitable polymerizable monomers include unsaturated aliphatic ethers of saturated polyhydric alcohols, for instance, divinyl, diallyl and dimethallyl ethers of glycol and the like. The polymerization product obtained ranges from a viscous liquid to a solid.

The sixth preferred embodiment of the invention pertaining to polymeric compositions is directed to the novel polymeric products resulting from the curing of the second preferred embodiment, supra, with active organic hardeners with or without the presence of acidic and basic catalysts, described hereinafter. The resulting products are useful, curable and cured compositions.

A singly ethylenically unsaturated epoxy sulfone or a mixture of at least two ethylenically unsaturated epoxy sulfones can be employed in the polymerization reaction. In general, when two ethylenically unsaturated epoxy sulfones are employed, the concentration of one of the monomers can vary over the entire range, preferably from 5 to 95 weight percent. If basic or acidic catalysts are employed, it is advantageous to add a catalyst in the temperature range from about 10 to about 250° C., preferably from 10 to about 100° C., preferably with agitation, to insure homogeneity of the resulting admixture. Catalyst concentrations can be varied over a broad range and can be selected on the basis of the rate of polymerization desired and the polymerization temperature to be used. It has been found that catalyst concentrations from about 0.005, or lower to 15 weight percent, or higher, preferably from about 0.01 to 5 weight percent, based on the weight of the monomer(s) used may be employed. The period of time required for the polymerization reaction can range from several minutes to 24 hours, and longer, depending on concentration of catalyst, temperature, the particular catalyst employed, and the ethylenically unsaturated epoxy monomer(s), and other factors.

The polymerization reaction, through the epoxide group, can be readily conducted in the presence of basic or acidic catalysts which include, for example, the metal halide Lewis acids, e.g., boron trifluoride, aluminum chloride, zinc chloride, stannic chloride, ferric chloride, boron trifluoride-piperdine complex, boron trifluoride-1,6-hexanediamine complex, boron trifluoride-monoethylamine complex, boron trifluoride-dimethyl ether complex, boron trifluoride-diethyl ether complex, boron trifluoride-dipropyl ether complex, and the like; the strong mineral acids, e.g. sulfuric acid, phosphoric acid, polyphosphoric acid, perchloric acid, and the like; the saturated aliphatic hydrocarbon sulfonic acids and the aromatic hydrocarbon sulfonic acids, e.g. ethanesulfonic acid, propanesulfonic acid, benzenesulfonic acid, toluenesulfonic acid, naphthalenesulfonic acid, lower alkyl substituted-benzenesulfonic acid, and the like; and the alkali metal hydroxides, e.g., sodium hydroxide, potassium hydroxide, and the like. When the catalyst and monomer(s) are imiscible, the catalyst can be added as a solution in an inert normally-liquid organic medium.

The ethylenically unsaturated epoxy sulfone(s) when polymerized through the epoxy group, may be further polymerized through the available unsaturated ethylenic groups in the presence of a catalytic quantity of a peroxide catalyst, described hereinafter, produce cross-linked, insoluble, infusible compositions. The polymerization reaction can be carried out in solution, emulsion, suspension and bulk systems. Examples of solution useful in a solution polymerization include acetone, tetrahydrofuran, dimethylformamide, benzene and the like. Catalyst concentrations can be varied over a broad range and can be selected on the basis of the rate of polymerization desired and the polymerization temperature to be used. The preferred catalyst concentration can vary from 0.1 percent to 5.0 percent by weight of the material to be polymerized. The period of time required for the polymerization reaction can range from several minutes to 40 hours, and longer depending on concentration of catalyst, temperature, and catalyst, among other factors. The temperature employed in the polymerization may vary from 0° C. to about 150° C. Preferred temperatures range from 40° C. to 60° C.

The catalyst used in effecting the cross-linking-polymerization reaction can be either inorganic or organic compounds and can be exemplified by acetyl peroxide, benzoyl peroxide, benzoylasetyl peroxide, tertiary-butyl hydroperoxide, tertiary-butyl peracetate, azo bis(isobutyronitrile) and the like.

The active organic hardeners illustrated hereinafter are employed in a curing amount, that is, an amount which is sufficient to cause the curable system comprising the initially polymerized ethylenically unsaturated epoxy sulfone(s) to become a thermosetting or thermoset resin. Representative active organic hardeners include polycarboxylic acids, polycarboxy polyesters, polycarboxylic acid anhydrides, polyols, i.e., polyhydric phenols and poly hydric alcohols, polyfunctional amines, polythiols, polyisocyanates, polyisothiocyanates, polyacyl halides and the like.

The compositions of the invention can be prepared by mixing the homopolymer of the ethylenically unsaturated epoxy sulfone(s), polymerized through the olefinic group or the copolymers of the ethylenically unsaturated epoxy sulfone(s) and a polymerizable monomer containing at least one ethylenically unsaturated polymerizable group, with the active organic hardener(s), preferably under agitation. The order of addition of the components does not appear to be critical.

The curable compositions of the invention can be partially cured or fully cured by maintaining the temperature in the range of from about 10° C., and lower, to about 250° C., and higher, and preferably from about 25° C. to about 200° C. A higher curing temperature generally will provide a thermosetting or thermoset resin the less time than a lower curing temperature. One preferable method is to heat the curable compositions to a temperature within the range from about 50° C. to 150° C. to first partially cure the composition. A temperature from about 100° C. to 200° C. then can be used to complete the cure. However, any one or combination of two or more temperatures within the specified range of 10° C. to 250° C. can be employed, if desired, to effect the full cure. For casting purposes the preferred minimum temperature of the normally-solid curable compositions is that at which said compositions from a uniform melt, whereas for coatings and the preparation of laminates, the use of solvents will allow the use of lower temperatures.

The time for effecting the partial cure or complete cure will be governed, to an extent, on several factors such as the particular homopolymer sulfone(s) or copolymers employed, the particular active organic hardener(s) employed, the proportions of homopolymer sulfone(s) or copolymers and active organic hardener, the inclusion of an active organic hardener and/or modifier, the inclusion of a catalyst, the concentration of the catalyst and/or modifier, the temperature for effecting the cure, and other considerations. In general, the time for effecting the complete cure can vary from several minutes to several days, e.g., from 10 minutes to one week, depending upon the correlation of such factors as illustrated above.

The novel curable, partially cured, and cured compositions comprise homopolymer or copolymer sulfone and polycarboxylic acid in such relative amounts as provide from about 0.1 to about 2.0 carboxyl groups, i.e,. —COOH groups, of said polycarboxylic acid per epoxy group, i.e.,

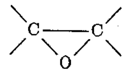

group, of homopolymer or copolymer sulfone, and preferably from about 0.3 to about 1.2 carboxyl groups per epoxy group.

Representative polycarboxylic acids which can be employed include, for example, oxalic acid, malonic acid, succinic acid, glutaric acid, adipic acid, pimelic acid, suberic acid, azelaic acid, sebacic acid, alkylsuccinic acids, alkenylsuccinic acids, ethylbutenylsuccinic acid, maleic acid, fumaric acid, itaconic acid, citraconic acid, mesaconic acid, glutaconic acid, ethylidenemalonic acid, isopropylidenemalonic acid, allylmalonic acid, muconic acid, alpho-hydromuconic acid, beta-hydromuconic acid, diglycolic acid, dilactic acid, thiodiglycolic acid, 4-amyl-2,5 - heptadienedioic acid, 3 - hexynedioic acid, 1,2-cyclohexanedicarboxylic acid, 1,4 - cyclohexanedicarboxylic acid, 2 - carboxy - 2 - methylcyclohexaneacetic acid, phthalic acid, isophthalic acid, terephthalic acid, tetrahydrophthalic acid, tetrachlorophthalic acid, 1,8 - naphthalenedicarboxylic acid, 3 - carboxycinnamic acid, 1,2 - napththalenedicarboxylic acid, 1,1,5 - pentanetricarboxylic acid, 1,2,4,-hexanetricarboxylic acid, 2 - propyl - 1,2,4 - pentanetricarboxylic acid, 5 - octene-3,3,6 - tricarboxylic acid, 1,2,3 - propanetricarboxylic acid, 1,2,4 - benzenetricarboxylic acid, 1,3,5 - benzenetricarboxylic acid, 3 - hexene - 2,2,3,4 - tetracarboxylic acid, 1,2,3,4 - benzenetetracarboxylic acid, 1,2,3,5-benzenetetracarboxylic acid, benzenepentacarboxylic acid, benzenehexacarboxylic acid, and the like.

Other novel curable, partially cured, and cured compositions comprise homopolymer or copolymer sulfone and polycarboxylic acid anhydride in such relative amounts so as to provide from about 0.1 to about 4.0 carboxyl groups of the polycarboxylic acid anhydride per epoxy group of the epoxy sulfone, and preferably from about 0.8 to about 2.5 carboxyl groups per epoxy group. It should be noted that by the expression "carboxyl groups of the polycarboxylic acid anhydride" is meant the carboxyl groups which would be contained by the corresponding polycarboxylic acid. For example, succinic anhydride does not possess any carboxyl groups per se; however, the corresponding polycarboxylic acid is succinic acid which contains two free carboxyl groups. Thus, succinic anhydride has two carboxyl groups as applied in the above expression. In different language, by the expression "carboxyl groups of polycarboxylic acid anhydride" is meant the carboxyl groups contained in the "hydrated" polycarboxylic acid anhydride.

Illustrative polycarboxylic acid anhydrides include the aliphatic, aromatic and cycloaliphatic acid anhydrides. The preferred anhydrides are the dicarboxylic acid anhydrides and preferably the hydrocarbon dicarboxylic acid anhydrides which include, for example, phthalic anhydride, tetrahydrophthalic anhydride, hexahydrophthalic anhydride, chlorendic anhydride, maleic anhydride, chloromaleic anhydride, dichloromaleic anhydride, citraconic anhydride, isocitraconic anhydride, glutaric anhydride, adipic anhydride, succinic anhydride, itaconic anhydride, heptylsuccinic anhydride, hexylsuccinic anhydride, methylbutylsuccinic anhydride, methyltetrahydrophthalic anhydride, n-nonenylsuccinic anhydride, octenylsuccinic anhydride, pentenylsuccinic anhydride, propylsuccinic anhydride, 4-nitrophthalic anhydride, 1,2-naphthalic anhydride, 2,3-naphthalic anhydride, 1,8-naphthalic anhydride, tetrabromophthalic anhydride, tetraiodophthalic anhydride, lower alkyl substituted bicyclo [2.2.1]-5-heptene-2,3-dicarboxylic anhydride, methylbicyclo[2.2.1]-5-heptene-2,3-dicarboxylic anhydride, and the like. Mixtures of anhydrides, polymeric anhydrides or mixed polmeric anhydrides of sebacic, adipic, pimelic, cyclohexane-1,4-dicarboxylic, terephthalic and isophthalic acids are also useful as modifiers in the preparation of the novel compositions. Acid dianhydrides such as 1,2,4,5-benzenetetracarboxylic dianhydride likewise are effective modifiers. Polycarboxylic acid anhydrides which have melting points below about 250° C. are satisfactory; those anhydrides possessing melting points below about 200° C. are preferred.

Further novel curable, partially cured, and cured compositions comprise homopolymer as copolymer sulfone and polyol in such relative amounts as provide from about 0.1 to about 2.0 hydroxyl groups, i.e., —OH groups, of said polyol per epoxy group of said epoxy sulfone, and preferably from about 0.2 to about 1.0 hydroxyl group per epoxy group. By the term "polyol," as used herein including the appended claims, is meant an organic compound having at least two hydroxyl groups, which are alcoholic hydroxyl groups, phenolic hydroxyl groups, or both alcoholic and phenolic hydroxyl groups. The term "polyol" preferably encompasses the polyhydric alcohols and the polyhydric phenols.

Illustrative of the polyols contemplated include, for example, the aliphatic and cycloaliphatic polyhydric alcohols, e.g., ethylene glycol, diethylene glycol, the polyethylene glycols, propylene glycol, the polypropylene glycols, the polyethylenepolypropylene glycols, trimethlyene glycol, the butanediols, the butenediols, the pentanediols, the pentenediols, 2-ethyl-1,3-hexanediol, the hexenediols, 2-methoxy-2,4-dimethyl-1,5-pentanediol, 12, 13,-tetracosanediol, polyglycerol, 1,1,1,-trimethylolpropane, pentaerythritol, sorbitol, the polyvinyl alcohols, the octenediols, the cyclopentanediols, the cyclohexanediols, the lower alkyl substituted cyclohexanediols, inositol, trimethylolbenzene; and the polyhydric phenols, e.g., resorcinol, catechol, pyrogallol, hydroquinone, the dihydroxytoluenes, dihydroxyxylene, bis(4-hydroxyphenyl)-2,2-propane, bis(4-hydroxyphenyl)methane, 1,9-naphthalenediol, the polyhydric phenolformaldehyde condensation products, and the like. The alkylene oxide adducts, e..g, ethylene oxide, propylene oxide, etc., of polyhydric alcohols or polyhydric phenols such as those illustrated above also are highly suitable. Polyols having melting points below about 250° C. are desirable; those polyols having melting points below about 200° C. are preferred.

Additional novel curable, partially cured, and cured compositions comprise homopolymer or copolymer sulfone and polycarboxy polyester in such relative amounts as provide from about 0.1 to about 2.0 carboxyl groups of said polycarboxy polyester per epoxy group of said epoxy sulfone, and preferably from about 0.3 to about 1.2 carboxyl groups per epoxy group. By the term "polycarboxy polyester," as used herein including the appended claims, is meant a polyester which contains at least two carboxyl groups in the average molecule. The polycarboxy polyesters can be prepared by known condensation procedures, employing mol ratios favoring greater than equivalent amounts of polycarboxylic acid or polycarboxylic acid anhydrides with relation to the polyhydric alcohol. More specifically, the amount of polycarboxylic acid or polycarboxylic acid anhydride which is employed in the esterification reaction should contain more carboxyl groups, collectively, than are required to react with the hydroxyl groups, contained in the amount of polyhydric alcohol so that the resulting esterified product, i.e., polycarboxy polyester, contains at least two free carboxyl groups in the average polycarboxy polyester molecule. The polycarboxylic acids, polycarboxylic acid anhydrides, and polyols which can be employed in the preparation of the polycarboxy polyesters have been illustrated previously. The polycarboxy polyesters can be obtained by condensing, in accordance with known procedures, a polyhydric alcohol and a polycarboxylic acid or a polycarboxylic acid anhydride. This condensation reaction may be conducted, for example, by heating the reactants to a temperature within the range from 100° C. to 200° C. with or without an acidic catalyst. Water formed by the condensation reaction may be removed by distillation. The course of the reaction may be followed by making acid number determinations and the reaction can be stopped when a suitable polycarboxy polyester has been obtained.

The invention also contemplates the modification of the properties and characteristics of the partially cured and fully cured compositions (resins) set forth previously in the discussion. Special and highly desirable effects can be imparted to the partially cured and fully cured compositions by incorporating a second active organic hardener (hereinafter termed "modifier") into the curable composition comprising the homopolymer or copolymer sulfone and "major" active organic hardener (i.e., polycarboxylic acid, polycarboxylic acid anhydrides, polyol, polycarboxy polyester, and the like). The proportions of modifier to "major" active organic hardener are such that the number of reactive groups contained by an amount of the modifier with relation to the number of reactive groups contained by an amount of the "major" active organic hardener will be in a ratio that is less than one. It is to be understood that the term "reactive groups" pertains to groups which are reactive with the epoxy groups contained in the epoxy sulfone. For instance, to a curable composition comprising the homopolymer or copolymer sulfone and polycarboxylic acid, there can be added an amount of a modifier, e.g., polycarboxylic acid anhydride, polycarboxy polyester, polyol, etc., such that the ratio of reactive groups contained by the modifier with respect to the carboxyl groups contained by the polycarboxylic acid is less than one. On this basis the modifier can be considered to be the minor component in relation to the polycarboxylic acid. As a second illustration, if the curable composition comprises a homopolymer or copolymer sulfone and polyol, an amount of modifier, e.g., polycarboxylic acid, polycarboxy polyester, polycarboxylic acid anhydride, polyisocyanate, polythiol, etc., can be added to said curable mixture such that the ratio of the reactive groups contained by the modifier with respect to the hydroxyl groups contained by the polyol is less than one. Again it will be noted that the modifier is the minor component with respect to the polyol. The modifiers which can be employed are those illustrated previously in the discussion of polycarboxylic acids, polycarboxylic acid anhydrides, polyols, polycarboxy polyesters, etc.

Other curable, and cured compositions comprise homopolymer or copolymer sulfones and a polyfunctional amine in such relative amounts so as to provide from about 0.2 to about 5.0 amino hydrogen atoms of the polyfunctional amine per epoxy group of the sulfone, and preferably from about 0.8 to about 2.0 amino hydrogen atoms per epoxy group. By the term "polyfunctional amine," as used herein including the appended claims, is meant an organic amine having at least two active amino hydrogen atoms which can be on the same nitrogen atom or on different nitrogen atoms.

Among the polyfunctional amine subclasses contemplated include the aliphatic amines, aromatic amines, aralkyl amines, cycloaliphatic amines, alkaryl amines, aliphatic polyamines including polyalkylene polyamines, amino-substituted monohydric and polyhydric aliphatic alcohols and phenols, polyamides, addition products of polyamines and low molecular weight epoxides containing oxirane oxygen linked to vicinal carbon atoms, and others.

Illustrative polyfunctional amines include, for example, methylamine, ethylamine, propylamine, isopropylamine, butylamine, isobutylamine, 2-ethylhexylamine, 3-propylheptylamine, aniline, o-hydroxyaniline, m-toluidine, 2,3-xylidine, mesidine, benzylamine, phenethylamine, 1-naphthylamine, meta-, ortho-, and para-phenylenediamines, 1,4 - naphthalenediamine, 3,4 - toluenediamine, cyclopentylamine, cyclohexylamine, p-menthane-1,8-diamine, ethanolamine, 2-aminopropanol, 3-aminobutanol, 1,3-diamino-2-propanol, 2-amino-phenol, 4-aminophenol, 2,3-diaminoxylenol, 4,4'-methylenedianiline, ethylenediamine, propylenediamine, butylenediamine, pentylenediamine, hexylenediamine, octylenediamine, nonylenediamine, decylenediamine, diethylenetriamine, triethylenetetramine, tetraethylenepentamine, dipropylenetriamine, and the like. The polyamides, i. e., those having an average molecular weight range from about 300 to about 10,000, include condensation products of polycarboxylic acids, in particular, hydrocarbon dicarboxylic acids, such as malonic acid, succinic acid, glutaric acid, adipic acid, dilinoleic acid, and the like, with polyamines, particularly diamines, such as ethylenediamine, propylenediamine, butylenediamine and the like.

Other illustrations of polyfunctional amines are the addition products of polyamines, in particular, diamines and triamines and epoxides containing oxirane oxygen linked to vicinal carbon atoms such as ethylene oxide, propylene oxide, butadiene dioxide, diglycidyl ether, epoxidized soybean oil, epoxidized safflower oil, and polyglycidyl polyethers, such as those prepared from polyhydric phenols and epichlorohydrin. Particularly useful polyfunctional amines are the mono- and poly-hydroxyalkyl polyalkylene polyamines preferably derived from ethylenediamine, propylenediamine, diethylenetriamine, dipropylenetriamine, triethylenetetramine, and the like, and ethylene oxide or propylene oxide. The amines so produced include the hydroxyalkyl-substituted alkylene polyamines such as N-hydroxyethylethylenediamine, N,N'-bis(hydroxyethyl)ethylenediamine, N,N' - bis(hydroxyethyl)diethylenetriamine, N,N - bis(hydroxyethyl)diethylenetriamine, N,N''-bis(hydroxyethyl)diethylenetriamine, N-hydroxypropyldiethylenetriamine, N,N-bis(hydroxypropyl-diethylenetriamine, N,N''-bis(hydroxypropyl)diethylenetriamine, N-hydroxyethylpropylenediamine, N-hydroxyethyldipropylenetriamine, N,N - bis(hydroxyethyl)dipropylenetriamine, N,N'-bis(hydroxyethyldipropylenetriamine, tris(hydroxyethyl)triethylenetetramine, and the like. Other polyfunctional amines can be prepared from known procedures by the addition reaction of polyglycidyl polyethers of dihydric phenols and polyamines, in particular, polyalkylene polyamines. Of particular importance in forming these epoxide polyamines adducts are the diglycidyl diethers of dihydric phenols such as for example, the homologues of dihydroxydiphenylmethanes singly or mixed and the dihydroxydiphenyldimethylmethanes singly or mixed. Mixtures of diglycidyl diethers of dihydric phenols can be prepared by reacting epichlorohydrin with a dihydric phenol using a molar excess of epichlorohydrin over the theoretical molar requirement. Substantially pure cuts of the diglycidyl diethers then can be obtained by fractional distillation under reduced pressure, for example. Illustratively, the polyfunctional amine, i.e., the epoxide polyamine adduct, itself can be prepared by mixing the diglycidyl polyether of a dihydric phenol with a polyalkylene diamine such as diethylenetriamine, dipropylenetriamine, and the like, bringing to an elevated temperature for example, up to about 200° C. and maintaining at such an elevated temperature for a period of from 4 to 5 hours. Alternatively, as an illustration, polyfunctional amines can be prepared by adding a diglycidyl diether of a dihydric phenol to a polyalkylene polyamine over a period of time, e.g., from about three to four hours, while maintaining the reaction mixture at an elevated temperature, for example up to about 200° C. and subsequently adding a dihydric phenol.

Examples of still other polyfunctional amines suitably adaptable for use in the present invention include, among other, heterocyclic nitrogen compounds such as piperazine, 2,5-dimethylpiperazine, and the like; aminoalkyl-substituted heterocyclic compounds such as N-(aminopropyl)morpholine, N-(aminoethyl)morpholine, and the like; amino-substituted heterocyclic nitrogen compounds such as melamine, 2,4-diamino-6-(aminoethyl-pyrimidine, and the like; dimethylurea, guanidine, 4,4'-sulfonyldianiline, 3,9-bis(aminoethyl)spirobimethanedioxane, hexahydrobenzamide, and others.

In the following illustrative examples, the examination and description of the resins were conducted at room temperature, i.e., about 24° C.

*Example 1*

To one mole of allyl vinyl sulfone which is maintained with stirring at 60° C., there is added dropwise over a period of one hour a 1.2 moles of a 25 percent solution of peracetic acid in ethyl acetate. After an additional seven hours at 60–70° C. the reaction is essentially complete as indicated by a titration for unreacted peracetic acid. The volatiles are removed by codistillation with ethylbenzene and the residue is distilled under reduced pressure to give about a 50 percent yield of glycidyl vinyl sulfone.

*Example 2*

A solution of bis(tricyclo[5.2.1.$0^{2,6}$]-3-decen-8-yl-oxy-ethyl) sulfide (obtained by the reaction of dicyclopentadiene and thiodiglycol) in ethyl acetate is treated dropwise with two equivalents of a 25 percent solution of peracetic acid in ethyl acetate at a temperature of approximately 0° C. to convert the sulfide to the corresponding sulfone, bis(tricyclo[5.2.$1^{2,6}$] - 3 - decen - yl - oxy-ethyl) sulfone. The solution is then warmed to 35° C. and exactly one additional equivalent of peracetic acid is added and the mixture kept at this temperature until substantially all of the peracetic acid is consumed. The volatiles are removed by codistillation with ethylbenzene and the excess ethylbenzene removed by vacuum stripping, thereby leaving a pale yellow residue product which is essentially 4 - oxatetracyclo[6.2.1.$0^{2,7}$.$0^{3,5}$]undec - 9 - yl-oxy-ethyl tricyclo[5.2.1.$0^{2,6}$]-3-decen-8-yloxyethyl sulfone as indicated by infra-red spectrum, epoxide analysis and iodine number.

*Example 3*

The synthesis of oleyl 10-undecenyl sulfone is performed by the procedure which involves the condensation of oleyl mercaptan with 10-undecenyl chloride in the presence of aqueous sodium hydroxide followed by the reaction of the resulting oleyl 10-undecenyl sulfide with two moles of peracetic acid. The epoxidation is readily accomplished by the dropwise addition of one mole of 25 percent solution of peracetic acid in ethyl acetate to one mole of oleyl 10-undecenyl sulfone which is maintained with stirring at 30° C. After a total reaction time of six hours, the reaction is essentially complete as indicated by a titration for unreacted peracetic acid. The volatiles are removed by co-distillation with ethylbenzene and the residue product finally freed of ethylbenzene by heating at 80° C. for one hour at a pressure of 1 millimeter of mercury. The 9,10-epoxyoctadecyl 10-undecenyl sulfone, thus obtained, is a viscous oil and contains about 87 percent of the theoretical amount of oxirane oxygen by epoxide analysis.

*Example 4*

A solution of allyl bicyclo[2.2.1]-5-hepten-2-ylmethyl sulfide (the Diels-Alder adduct of diallyl sulfide and cyclopentadiene) in ethylacetate is treated dropwise with stirring with two equivalents of a 25 percent solution of peracetic acid in ethyl acetate at 0–10° C. to form the corresponding allyl bicyclo[2.2.1]-5-hepten-2-ylmethyl sulfone. The temperature is then raised 45° C. and an additional 1.2 equivalents of peracetic acid solution is then added dropwise and the reaction mixtures are stirred at 45° C. until analysis for peracetic acid indicates that the theoretical (3 equivalents) amount of peracid has been consumed. The reaction mixture is then fed dropwise into a still kettle containing ethylbenzene under reflux at such a pressure as to keep the kettle temperature at 50° C. The excess peracetic acid, acetic acid, ethyl acetate and ethylbenzene are continuously removed at the still head. Finally, the residue product is isolated by removing the last of the ethylbenzene under reduced pressure. The residue product, allyl 3-oxatricyclo[3.2.1.$0^{2,4}$]oct-6-ylmethyl sulfone is identified by its infra-red spectrum and analysis for epoxide.

*Example 5*

To a round-bottom flask, 432 grams (6 moles) of methally alcohol and 7.2 grams of sodium hydroxide were added. To this mixture at 70° C., there was added slowly 236 grams (2 moles) of divinyl sulfonte. The addition of the hydroxyl group to the vinyl group was exothermic and the reaction was maintained at about 70° C. by either heating or cooling. The mixture was maintained at 70° C. for 10 hours after which time the system was cooled and neutralized with hydrochloric acid. The excess methallyl alcohol (165 grams) was removed by vacuum distillation and the product, bis(methallyloxyethyl) sulfone, was then flash distilled (boiling point 153° C. at 1.5 millimeters) giving 411 grams of material having an unsaturation analysis (bromine) of 140 grams per double bond (calculated 131) and a refractive index at 30° C. of 1.4738.

*Example 6*

The epoxidation of the diene prepared in Example 5 was carried out in the following manner. Bis(methallyloxyethyl) sulfone (180 grams) was maintained at 30° C. to 40° C. while a weight of 225.5 grams of a solution containing 27.8 percent peracetic acid in ethyl acetate was slowly added. After 11 hours, analysis of the mixture for peracetic acid indicated that 98.7 percent of the available peracid had been consumed. The acetic acid and ethyl acetate were removed by azeotropic distillation with ethylbenzene taking care to maintain the kettle temperature at 55° C. Molecular distillation of the remaining residue product gives a liquid head cut of methallyloxyethyl methylglycidyloxyethyl sulfonte as shown by its infra-red absorption spectrum.

*Example 7*

Divinyl sulfonte (236 grams, 2 moles), butadiene (432 grams, 8 moles), sulfuryl chloride (3 grams) and "Agerite Powder" (phenyl-beta-naphthylamine, 3 grams) were mixed together at —50° C. and charged to a 3-liter Adkins bomb which was fitted only with a pressure gauge and blow-off line aside from the usual agitation equipment. When the temperature in the bomb was raised to 144° C., with agitation, the internal pressure rose to 400 lbs. per square inch, gauge. Heating was continued for 6.5 hours at 140–145° C. and the internal pressure decreased to a constant 125 pounds per square inch, gauge.

The bomb was allowed to cool to room temperature and the excess butadiene was vented to the atmosphere. Solid product weighing 562 grams was then removed from the bomb and recrystallized twice from methanol to give 246 grams (54.5 percent yield) of bis(3-cyclohexenyl) sulfone, melting point 139.5–140° C.

*Analysis.*—Found: 63.6% C, 8.4% H, 12.96% S. Theory for $C_{12}H_{18}O_2S$: 63.7% C, 8.0% H, 14.1% S. The compound was structurally confirmed by infra-red analysis.

*Example 8*

Bis(3-cyclohexenyl) sulfone (45 grams) and ethylbenzene (150 grams) are charged to a 1-liter 4-neck flask equipped with stirrer, condenser, thermometer and dropping funnel. Peracetic acid in ethyl acetate (50 grams of 22.5 percent concentration) is added dropwise to the reaction vessel over a period of one hour at 40° C. At the end of the peracetic acid addition the reaction is maintained at 40° C. for an additional 4 hours, at which time an analysis for peracetic acid indicates the reaction is essentially complete. The reaction mixture is then cooled to —30° C. by means of a Dry-Ice acetone bath, and a crop of crystals is removed by filtration. Upon evaporation of the ethyl acetate and by-product acetic acid, there is obtained a solid product which is predominantly 3-cyclohexenyl 7-oxabicyclo[4.1.0]hept-3-yl sulfone as determined by epoxide analysis and by the infra-red absorption spectrum of the compound.

*Example 9*

To a round-bottomed flask, 744 grams 6-methyl-3-cyclohexenylmethanol and 0.72 gram of potassium hydroxide were added. To this mixture at 70° C., there was added slowly 236 grams (2 moles) of divinyl sulfone. The addition of the hydroxyl group to the vinyl group was exothermic, and the reaction was maintained at about 70° C. by either heating or cooling. The mixture was maintained at 70° C. for 10 hours after which time the system was cooled and neutralized with hydrochloric acid. The excess 6-methyl-3-cyclohexenylmethanol was removed by vacuum distillation and the crude product was then flash distilled (under reduced pressure), to provide 714 grams of distilled material. The 2,2'-bis(6-methyl-3-cyclohexenylmethoxy)ethyl sulfone was 96.2 percent pure according to the unsaturation analysis.

*Example 10*

To 316 grams of 2,2'-bis(6-methyl-3-cyclohexenylmethoxy)-ethyl sulfone are added slowly 78 grams of a 21.7 percent solution of peracetic acid in ethyl acetate. After 10 hours at 40° C., analysis indicates that 91 percent of the theoretical amount peracetic acid has been consumed. The acetic acid and ethyl acetate are removed by azeotropic distillation with ethylbenzene taking care to maintain the kettle temperature at 55° C. Distillation of this reaction product under high vacuum gives a heads cut of 6-methyl-3-cyclohexenylmethoxyethyl 4-methyl-7-oxabicyclo[4.1.0]hept-3-ylmethoxyethyl sulfone as shown by its infrared spectrum.

*Example 11*

Diallylsulfone (438 grams, 3.0 moles) was placed in a flask equipped with a stirrer, a thermometer, and an addition funnel. Then at 80° C. with constant stirring, 316 grams of peracetic acid solution (1.0 moles of a 24 percent solution in acetone) was added over a 30-minute period. After an additional 2 hours at 75–80° C., analysis showed that 85 percent of the theoretical amount of peracid had been consumed. By-product acetic acid was then removed by azeotropic distillation with ethylbenzene. Continued reduced pressure distillation gave crude allyl glycidyl sulfone boiling at 110–145° C. at 3 millimeters. Redistillation gave 21 grams of the product (boiling point, 110° C. at 0.1 millimeter *n* 30/D 1.4895) which by a conventional pyridine hydrochloride procedure was found to be 89.5 percent pure calculated as allyl glycidyl sulfone.

*Example 12*

A mixture of 3-cyclohexenecarboxylic acid (1590 grams, 12.6 moles), thiodiglycol (731 grams, 6 moles), toluene (500 grams), and concentrated sulfuric acid (6 grams) was charged to a still kettle and refluxed until no more water separated at the still head (approximately eight hours). Titration for acidity at this point indicated the reaction was 70 percent complete. An additional 2.4 moles of 3-cyclohexenecarboxylic acid and 6 grams of sulfuric acid were then added and refluxing was continued for 4.5 hours longer. The sulfuric acid catalyst was neutralized with 100 percent excess of sodium acetate. A 46 percent yield (931 grams) of pure 2,2′-thiodiethanol bis(3-cyclohexenecarboxylate) having a boiling point 220° C. at 2 millimeters, and a refractive index of 1.5120 (*n* 30/D) was isolated by fractional distillation.

*Analysis.*—Calculated for $C_{18}H_{26}O_4S$: 63.87% C, 7.74% H. Found: 63.70% C, 7.8% H.

*Example 13*

An amount of 433 grams (1.28 moles) of 2,2′-thiodiethanol bis(3-cyclohexenecarboxylate) is placed in a flask fitted with a stirrer, reflux condenser, thermometer, and dropping funnel, and cooled at 20° C. Then, while the flask contents are stirred and maintained at 20° C. peracetic acid solution (1360 grams (4.48 moles) of a 25 percent solution in acetone) is added dropwise over a period of four hours. After standing overnight at room temperature the solution is cooled to —20° C. Crystals of 2,2′-sulfonyldiethanol 3-cyclohexenecarboxylate 7-oxabicyclo[4.1.0]hept-3-anecarboxylate are collected from the sides of the vessel and further refined by recrystallization from warm ethanol.

*Example 14*

To 676 grams of dicyclopentadiene were added 125 grams of allyl mercaptan at 65° C. over a 30 minute period. The temperature was elevated gradually to 95° C. and held there for four hours. Distillation of the product under reduced pressure gave 64 grams of allyl tricyclo[5.2.1.0$^{2,6}$]-3-decen-8-yl sulfide, a colorless liquid having the following properties:

Boiling point: 105–121° C. at 2 millimeters.
Refractive index: 1.5407–1.5448 (*n* D/30).
Elemental analysis: Calculated for $C_{13}H_{18}S$—percent S, 15.53. Found—percent S, 15.25, 15.60.
Infra-red spectrum: Characteristic of structure Double bond bands at 6.1 and 6.2μ 5.45 and 10.9μ.

*Example 15*

A solution of 52 grams of allyl tricyclo[5.2.1.0$^{2,6}$]-3-decen-8-yl sulfide in 75 grams of ethyl acetate was treated with 149 grams of a 27 percent solution of peracetic acid in ethyl acetate at 0° C. The reaction was exothermic, and 1.25 hours were required to add the peracid dropwise. The reaction mixture was allowed to warm to room temperature in order to complete the consumption of peracetic acid. The volatiles were removed by codistillation with ethylbenzene and the product was stripped free of ethylbenzene to a residue weight of 64 grams. The residue product was taken up in a mixture of ethylbenzene and petroleum either (60–70° C.) was cooled to —78° C. overnight. The white solid which crystallized out was filtered and dried. There was obtained 32 grams of crystalline allyl tricyclo[5.2.1.0$^{2,6}$]-3-decen-8-yl sulfone, melting point 44° C.

*Analysis.*—Calculated for $C_{13}H_{13}O_2S$: 13.46% S. Found: 13.7% S.

*Example 16*

A solution of 29 grams of allyl tricyclo[5.2.1.0$^{2,6}$]-3-decen-8-yl sulfone in 96 grams of ethyl acetate was treated with 40.5 grams of a 25.1 percent solution of peracetic acid in ethyl acetate at a temperature of 40° C. After three hours, the temperature was raised to 55° C. and held at this temperature for 7 hours after which time an analysis for peracetic acid indicated a conversion of 87 percent. The reaction mixture was diluted with ethylbenzene and the volatiles were stripped off After removal of the ethylbenzene, there was obtained 24 grams of a semi-solid residue product. Recrystallization of a small analytical sample once from ethanol gave a good recovery of allyl 4-oxatetracyclo[6.2.1.0$^{2,7}$.0$^{3,5}$]undec-9-yl sulfone having the following properties:

Appearance: White crystalline solid.
Melting point: 88–89° C.
Analysis: Calculated for $C_{13}H_{18}O_3S$—percent C, 61.39; percent H, 7.13; percent S, 12.61. Found—percent C, 61.69; percent H, 7.26; percent S, 12.80.
Infra-red spectrum: Consistent with structure.

*Example 17*

Divinyl sulfone, 708 grams (6 moles), benzene (900 milliliters) and hydroquinone (1 gram), were stirred together in a reaction flask and heated to 50° C. Cyclopentadiene, 132 grams (2 moles) was fed dropwise to the flask during about three hours. The reaction was exothermic and the temperature was controlled at 50–55° C. by intermittent cooling with a water bath. After the completion of the cyclopentadiene feed, the reaction product was stirred until the exothermic reaction subsided and then heated at 50° C. for three hours with stirring. The reaction product was charged to a Claisen-type still and fractionated to give recovered benzene, 413 grams of unreacted divinyl sulfone, 229 grams of bicyclo[2.2.1]-5-hepten-2-yl vinyl sulfone boiling at 131–135° C. at 2 millimeters and having a refractive index of 1.5249 (*n* 30/D), 119 grams of midfraction and 50 grams of residue. Analysis by infra-red absorption spectroscopy showed strong terminal unsaturation bands present in the spectrum of the main product. Elemental analysis showed 17.76 percent sulfur in the product (theoretical value for $C_9H_{12}O_2S$, percent sulfur=17.38 percent).

*Example 18*

To bicyclo[2.2.1]-5-hepten-2-yl vinyl sulfone (226 grams) were added over a 1.5 hour period 394 grams of a 25.6 percent solution of peracetic acid in ethyl acetate. The temperature was maintained at 40° C. by cooling with ice water. After an additional two-hour reaction period at 40° C. and standing overnight at —5° C. the reaction was 90 percent complete as indicated by an analysis for peracetic acid. The volatiles were stripped from the reaction mixture by codistillation with ethylbenzene. The residue product was distilled under reduced pressure. There were obtained 180 grams (74.5 percent yield) of 3-oxatrivyclo-[3.2.1.0$^{2,4}$]oct-6-yl vinyl sulfone, a colorless liquid which gradually crystallized on standing. The freshly distilled product has the following properties:

Boiling point: 136–138° C. 0.4 millimeter Hg.
Refractive index: 1.5268 (*n* 30/D).
Elemental analysis: Calculated for $C_9H_{12}O_3S$—percent C, 93.98; percent H, 6.04. Found: percent C, 54.13; percent H, 6.10.

*Example 19*

Divinyl sulfone (170 grams, 1.44 moles), benzene (300 grams) and hydroquinone (0.2 gram) were stirred together in a reaction flask while 208 grams (3.16 moles) of freshly distilled cyclopentadiene were added dropwise during about 1 hours. The reaction mixture was cooled as required to control the temperature at 50–60° C. Stirring was continued for about an hour and the reaction mixture was allowed to stand overnight at room temperature. Then, the reaction mixture was transferred to a boiling flask and stripped free of solvent in a short Claisen-type still to a final kettle temperature of 150° C. at 2 millimeters. The residue product was then distilled and there were obtained 170 grams of a fraction having a boiling point of 150–165° C., at 0.5 millimeter Hg which crystallized on standing. A small sample which was recrystallized from isopropyl ether had a melting point of 89–92° C. The product identity of the bis(bicyclo[2.2.1]-5-hepten-2-yl sulfone, was confirmed by elemental and infra-red spectrum analyses: Found—66.9% C, 7.5% H, 12.5% S. (theoretical values for $C_{14}H_{18}O_2S$—67.2% C, 7.2% H, 12.8% S.).

*Example 20*

A solution of bis(bicyclo[2.2.1]-5-hepten-2-yl) sulfone in ethyl acetate is charged to a 0.5 liter 4—neck flask equipped with stirrer, condenser, thermometer, and dropping funnel Peracetic acid in ethyl acetate is added dropwise to the stirred sulfone at 40° C. over a period of 1.75 hours, after which the reaction is continued at 40° C. for an additional 3.25 hours at which time an analysis for peracetic acid indicates that the reaction is essentially complete. The reaction mixture is added dropwise to the kettle of a still containing ethylbenzene under reflux at reduced pressure. Peracetic acid, ethyl acetate, ethylbenzene and acetic acid are removed as a distillate. Removal of the remaining ethylbenzene is accomplished by vacuum stripping leaving a slightly colored residue product which is essentially bicyclo[2.2.1]-5-hepten-2-yl 3-oxatricyclo[3.2.1.$0^{2,4}$]oct-6-yl sulfone. Its infrared spectrum, iodine number, and epoxide analysis are compatible with the assigned structure.

*Example 21*

To a Pyrez tube is charged a mixture of 1.0 gram of glycidyl vinyl sulfone, 9.0 grams of vinyl chloride, 5.0 milliliters of acetone and 1.0 milliliter of a 25 percent solution of acetyl peroxide in dimethyl phthalate.

The tube is purged with nitrogen, sealed and rocked in a water bath at 50° C. for 22 hours. The polymer which is formed is recovered and cast as a film from a cyclohexanone solution containing one percent phosphoric acid (based on resin weight). When the film is cured at 100° C. there is obtained an insoluble, infusible plaque.

*Example 22*

To a Pyrex tube is charged a mixture of 5.0 grams of 4-oxatetracyclo[6.2.1.$0^{2,7}$·$0^{3,5}$]undec-9-yloxyethyl tricyclo-[5.21.$0^{2,6}$]-3-decen-8-yloxyethyl sulfone, 5.0 grams of acrylonitrile, 5.0 milliliters of acetone, and 1.0 milliliter of a 25 percent solution of dimethyl phthalate. The tube is purged with nitrogen, sealed and rocked in a water bath at 50° C. for 14 hours. The polymer which is formed is cast as a film from a dimethylformamide solution of the polymer containing one percent phosphoric acid (based on resin weight). When the film is cured at 100° C. for 5 hours there is obtained in insoluble, infusible plaque.

*Example 23*

To a Pyrex tube is charged a mixture of 5.0 grams of allyl glycidyl sulfone, 5.0 grams of ethyl acrylate, and 1.0 milliliter of a 25 percent solution of acetyl peroxide in dimethyl phthalate. The tube is purged with nitrogen, sealed and rocked in a water bath at 50° C. for 43 hours. The recovered polymer is a fusible resin.

*Example 24*

To a Pyrex tube is charged a mixture of 8 grams of allyl 4-oxatetracyclo[6.2.1.$0^{2,7}$.$0^{3,5}$]undec-9-yl sulfone, 2.0 grams of chlorostyrene, and 2.0 milliliters of a 25 percent solution of acetyl peroxide in dimethyl phthalate. The tube is purged with nitrogen, sealed and rocked in a water bath at 50° C. for 22 hours. The polymer which is recovered is cast as film from a cyclohexanone solution of the polymer containing one percent phosphoric acid (based on resin weight). When the film is cured at 100° C. for 5 hours there is formed an insoluble, infusible plaque.

*Example 25*

To a Pyrex tube is charged a mixture of 10.0 grams of allyl glycidyl sulfone, and 2.0 milliliters of a 25 percent solution of acetyl peroxide in dimethyl phthalate. The tube and contents are heated at 100° C. for 17 hours. The resulting product is a fusible homopolymeric product. This fusible polymeric product is heated at a temperature of 100° C. for 5 hours in the presence of 0.5 gram of boron trifluoride-monoethylamine complex to obtain a hard, infusible, thermoset resin.

*Example 26*

Allyl glycidyl sulfone (10 grams) is mixed with 0.5 gram of boron trifluoride-monoethylamine complex and heated to 70° C. for 7 hours. The resulting material is a fusible homopolymeric product. The homopolymeric product is heated to 75° C. for 4 hours in the presence of 1.0 milliliter of a 25 percent solution of benzoyl peroxide in dimethyl phthalate to obtain a hard, thermoset, infusible product.

*Example 27*

A weight of 10 grams of 3-oxatricyclo[3.2.1.$0^{2,4}$]oct-6-yl vinyl sulfone (10 grams) is mixed with 0.05 gram of benzoyl peroxide and heated at 100° C. for 12 hours. A fusible product is obtained. The fusible product and citroconic acid are admixed in amounts so as to provide 0.8 carboxyl group of said acid per epoxy group of the fusible product. The resulting admixture then is heated to 120° C. for 5 hours plus an additional 6 hours at 160° C. There is obtained a hard resin.

*Example 28*

Allyl glycidyl sulfone (10 grams) is mixed with 0.05 gram of benzoyl peroxide and heated at 100° C. for 12 hours. A fusible product is obtained. This fusible product and phthalic anhydride are admixed in amounts so as to provide 0.8 carboxyl group of said anhydride per epoxy group of the fusible product. The resulting admixture then is heated to 120° C. for 5 hours plus an additional 6 hours at 160° C. There is obtained a hard resin.

Analogously, when the initial polymerized products of 4-oxatetracyclo[6.2.1.$0^{2,7}$.$0^{3,5}$]undec-9-yloxyethyl tricyclo[5.2.1.$0^{2,6}$]-3-decen-8-yloxyethyl sulfone, allyl 3-oxatricyclo[3.2.1.$0^{2,4}$]oct-6-ylmethyl sulfone, bicyclo[2.2.1]-5-hepten-2-yl 3-oxatricyclo[3.2.1.$0^{2,4}$]oct-6-yl sulfone, or 3-cyclohexenylmethoxyethyl 7-oxabicyclo[4.1.0]hept-3-ylmethoxyethyl sulfone, are admixed individually with succinic anhydride in amounts so as to provide 1.0 carboxyl group of said anhydride per epoxy group of said polymerized product, followed by curing the resulting admixture under essentially similar operative conditions, there are obtained hard, infusible resins.

*Example 29*

Allyl 3-oxatricyclo[3.2.1.$0^{2,4}$]oct-6-ylmethyl sulfone (30 grams) is mixed with 0.15 gram of benzoyl peroxide and heated at 100° C. for 14 hours. A fusible product is obtained. This fusible product and adipic are admixed in amounts so as to provide 0.6 carboxyl group of said acid per epoxy group of said fusible product. The resulting admixture is then heated to 120° C. for 6 hours plus an additional 5 hours at 160° C. There is obtained a hard resin.

*Example 30*

Allyl glycidyl sulfone (30 grams) is mixed with 0.15 gram of benzoyl peroxide and heated at 100° C. for 12 hours. A fusible product is obtained. This fusible product and sebacic acid are admixed in amounts so as to provide 1.0 carboxyl group of said acid per epoxy group of said fusible product. The resulting admixture is then heated to 120° C. for 6 hours plus an additional 6 hours at 160° C. There is obtained a hard resin.

*Example 31*

The compound, methallyloxyethyl methylglycidyloxyethyl sulfone (30 grams) is mixed with 0.15 gram of benzoyl peroxide and heated at 100° C. for 14 hours. A fusible product is obtained. This fusible product and bis(4-hydroxyphenyl)-2,2-propane are admixed in amounts so as to provide 1.0 hydroxyl group of said bis(4-hydroxyphenyl)-2,2-propane per epoxy group of said fusible product. The resulting admixture is then heated to 120° C. for 6 hours plus an additional 5 hours at 160° C. There is obtained a hard resin.

*Example 32*

The compound, 3-cyclohexenyl 7-oxabicyclo[4.1.0]-hept-3-yl sulfone (30 grams) is mixed with 0.15 gram of benzoyl peroxide and heated at 100° C. for 14 hours. A fusible product is obtained. This fusible product and resorcinol are admixed in amounts so as to provide 1.0 hydroxyl group of said resorcinol per epoxy group of said fusible product. The resulting admixture is then heated to 120° C. for 6 hours plus an additional 5 hours at 160° C. There is obtained a hard resin.

*Example 33*

The compound, 3-cyclohexenylmethoxyethyl 7-oxabicyclo-[4.1.0]hept-3-ylmethoxyethyl sulfone (30 grams) is mixed with 0.15 gram of benzoyl peroxide and heated at 100° C. for 14 hours. A fusible product is obtained. This fusible product and adipic acid are admixed in amounts so as to provide 1.0 carboxyl group of said acid per epoxy group of said fusible product. The resulting product is dissolved in methyl isobutyl ketone at 100° C. and an iron panel or strip is dipped into the resulting solution. The iron panel subsequently is removed from this solution, is air dried for 15 minutes, and is baked at 160° C. for 2 hours. A thin coating is observed on that portion of the dipped iron panel. The resulting coating on the panel is glossy and tough. The coating displays excellent adhesion to the panel.

*Example 34*

To a Pyrex tube is charged a mixture of 1.0 gram of glycidyl vinyl sulfone, 9.0 grams of vinyl chloride, 5.0 milliliters of acetone, and 1.0 milliliter of a 25 percent solution of acetyl peroxide in dimethyl phthalate. The tube is purged with nitrogen, sealed and rocked in a water bath at 50° C. for 22 hours. The polymer which is formed is admixed in with phthalic anhydride in an amount so as to provide 0.8 carboxyl group of said anhydride per epoxy group of the polymer product. The resulting admixture then is heated to 120° C. for 5 hours plus an additional 6 hours at 160° C. There is obtained a hard resin.

*Example 35*

To a Pyrex tube is charged a mixture of 5.0 grams of 4-oxatetracyclo[$6.2.1.0^{2,7}.0^{3,5}$]undec-9-yloxyethyl tricyclo [$5.2.1.0^{2,6}$]-3-decen-8-yloxyethyl sulfone, 5.0 grams of acrylonitrile, 5.0 milliliters of acetone, and 1.0 milliliter of a 25 percent solution of acetyl peroxide in dimethyl phthalate. The tube is purged with nitrogen, sealed and rocked in a water bath at 50° C. for 14 hours. The polymer which is formed is recovered and admixed with adipic acid and in an amount so as to provide 0.6 carboxyl group of said carboxylic acid per epoxy group of the polymer product. The resulting admixture then is heated to 120° C. for 5 hours plus an additional 6 hours at 160° C. There is obtained a hard resin.

*Example 36*

To a Pyrex tube is charged a mixture of 5.0 grams of allyl glycidyl sulfone, 5.0 grams of ethyl acrylate, 5.0 milliliters of acetone, and 1.0 milliliter of a 25 percent solution of acetyl peroxide in dimethyl phthalate. The tube is purged with nitrogen, sealed and rocked in a water bath at 50° C. for 43 hours. The polymer which is formed is recovered and admixed with catechol in an amount so as to provide 1.0 hydroxyl group of said catechol per epoxy group of the polymer product. The resulting admixture then is heated to 120° C. for 5 hours plus an additional 6 hours at 160° C. There is obtained a hard resin.

*Example 37*

To a Pyrex tube is charged a mixture of 8.0 grams of allyl 4-oxatetracyclo[$6.2.1.0^{2,7}.0^{3,5}$]undec-9-yl sulfone, 2.0 grams of chlorostyrene, 5.0 milliliters of acetone, and 1.0 milliliter of a 25 percent solution of acetyl peroxide in dimethyl phthalate. The tube is purged with nitrogen, sealed and rocked in a water bath at 50° C. for 17 hours. The polymer which is formed is recovered and admixed with glycerol in an amount so as to provide 1.0 hydroxyl group of said glycerol per epoxy group of the polymer product. The resulting admixture then is heated to 120° C. for 5 hours plus an additional 6 hours at 160° C. There is obtained a hard resin.

What is claimed is:

1. An ethylenically unsaturated mono-epoxy sulfone characterized by the general formula:

$$R—(X)_n—SO_2—(X)_n—R_1$$

wherein R is selected from the group consisting of (a) a vic-epoxyalkyl radical wherein the vic-epoxy moiety is at least one carbon atom removed from the sulfonyl group, (b) a vic-epoxycycloalkyl radical wherein the cycloalkyl ring contains from 5 to 7 carbon atoms and wherein the vic-epoxy moiety is at least one carbon atom removed from the sulfonyl group, (c) a vic-epoxycycloalkylalkyl radical wherein the cycloalkyl ring contains from 5 to 7 carbon atoms, (d) a 3-oxatricyclo[$3.2.1.0^{2,4}$]oct-6-yl radical, and (e) a 4-oxatetracyclo[$6.2.1.0^{2,7}.0^{3,5}$]undec-9-yl radical; wherein $R_1$ is selected from the group consisting of (a) an alkenyl radical, (b) a cycloalkenyl radical wherein the cycloalkenyl ring contains from 5 to 7 carbon atoms, (c) a cycloalkenylalkyl radical wherein the cycloalkenyl ring contains from 5 to 7 carbon atoms, (d) a bicyclo[2.2.1]-5-hepten-2-yl radical, and (e) a tricyclo-[$5.2.1.0^{2,6}$]-3-decen-8-yl radical; wherein each X, individually, is selected from the group consisting of carbonyloxylalkylene and oxalkylene wherein the alkylene group of each member contains at least 2 carbon atoms; where each *n*, individually, is an integer having a value less than two including zero; with the proviso that when *n* equals one, then the sulfonyl group is bonded to the alkylene moiety of the X variable.

2. An alkenyl vic-epoxyalkyl sulfone wherein the vic-epoxy moiety is at least one carbon atom removed from the sulfonyl group.

3. An alkenyl vic-epoxycycloalkyl sulfone wherein the vic-epoxy moiety is at least one carbon atom removed from the sulfonyl group.

4. an alkenyl 3-oxatricyclo[$3.2.1.0^{2,4}$]oct-6-yl sulfone.

5. An alkenyl 4-oxatetracyclo[$6.2.1.0^{2,7}.0^{3,5}$]undec-9-yl sulfone.

6. A cycloalkenyl vic-epoxycycloalkyl sulfone wherein the vic-epoxy moiety is at least one carbon atom removed from the the sulfonyl group.

7. Allyl glycidyl sulfone.

8. Allyl 4-oxatetracyclo[$6.2.1.0.^{2,7}.0^{3,5}$]undec-9-yl sulfone.

9. 3-oxatricyclo[$3.2.1.0^{2,4}$]oct-6-yl vinyl sulfone.

10. A process for the production of an ethylenically unsaturated monoepoxy sulfone characterized by the general formula:

$$R—(X)_n—SO_2—(X)_n—R_1$$

wherein R is selected from the group consisting of (a) a vic-epoxyalkyl radical wherein the vic-epoxy moiety is at least one carbon atom removed from the sulfonyl group, (b) a vic-epoxycycloalkyl radical wherein the cycloalkyl ring contains from 5 to 7 carbon atoms and wherein the vic-expoxy moiety is at least one carbon atom removed from sulfonyl group, (c) a vic-epoxycycloalkylalkyl radical wherein the cycloalkyl ring contains from 5 to 7 carbon atoms, (d) a 3-oxatricyclo[$3.2.1.0^{2,4}$]oct-6-yl radical, and (e) a 4-oxatetracyclo[$6.2.1.0^{2,7}.0^{3,5}$]undec-9-yl radical; wherein $R_1$ is selected from the group consisting of (a) an alkenyl radical, (b) a cycloalkenyl radical wherein the cycloalkenyl ring contains from 5 to 7 carbon atoms, (c) a cycloalkenylalkyl radical wherein the cycloalkenyl ring contains from 5 to 7 carbon atoms (d) a bicyclo[2.2.1]-5-hepten-2-yl radical, and (e) a tricyclo

[5.2.1.0.$^{2,6}$]-3-decen-8-yl radical; wherein each X, individually, is selected from the group consisting of carbonyloxylalkylene and oxyalkylene wherein the alkylene group of each member contains at least 2 carbon atoms; wherein each *n*, individually, is an integer having a value less than two including zero; with the proviso that when *n* equals one, then the sulfonyl group is bonded to the alkylene moiety of the X variable; which comprises reacting an ethylenically unsaturated nonepoxidized sulfone precursor of the ethylenically unsaturated monoepoxy sulfone characterized by the general formula herein in molar excess with an organic peracid at a temperature in the range from about 0° C. to about 100° C. and recovering the ethylenically unsaturated epoxy sulfone.

11. The homopolymer of an ethylenically unsaturated epoxy sulfone defined in claim 1.

12. The homopolymer of the ethylenically unsaturated epoxy sulfone defined in claim 1 wherein the polymerization occurs through the olefinic groups.

13. The homopolymer of the ethylenically unsaturated epoxy sulfone defined in claim 1 wherein the polymerization occurs through the epoxy groups.

14. A polymerized composition comprising the homopolymer of claim 12 polymerized through the epoxy groups.

15. A polymerized composition comprising the homopolymer of claim 13 polymerized through the olefinic groups.

16. The homopolymer of an alkenyl vic-epoxyalkyl sulfone.

17. The homopolymer of allyl glycidyl sulfone.

18. A curable composition comprising the homopolymer of claim 12 and a curing amount of an active organic hardener selected from the group consisting of polycarboxylic acids, polycarboxylic anhydrides, polyhydric alcohols, polyhydric phenols, polyfunctional amines, polyisocyanates, polyisothiocyanates, and polyacyl halides.

19. A cured thermoset resin obtained from the composition defined in claim 18.

20. A copolymer of an ethylenically unsaturated epoxy sulfone as defined in claim 1 and a polymerizable monomer containing at least one ethylenically unsaturated polymerizable group, said epoxy sulfone polymerized through the ethylenically unsaturated group.

21. A curable composition comprising the copolymer as defined in claim 20 and a curing amount of an active organic hardener selected from the group consisting of polycarboxylic acids, polycarboxylic anhydrides, polyhydric alcohols, polyhydric phenols, polyfunctional amines, polyisocyanates, polyisothiocyanates and polyacyl halides.

22. The homopolymer of allyl 4-oxatetracyclo-[6.2.1.$^{2,7}$.0$^{3,5}$]undec-9-yl sulfone.

References Cited by the Examiner

UNITED STATES PATENTS

| | | | |
|---|---|---|---|
| 2,771,470 | 11/1956 | Mark | 260—348 |
| 3,018,259 | 1/1962 | Frostick et al. | 260—348 |

JOSEPH L. SCHOFER, *Primary Examiner.*

H. N. BURSTEIN, *Examiner.*